US008823769B2

(12) United States Patent
Sekine

(10) Patent No.: US 8,823,769 B2
(45) Date of Patent: Sep. 2, 2014

(54) THREE-DIMENSIONAL VIDEO CONFERENCING SYSTEM WITH EYE CONTACT

(75) Inventor: Hitoshi Sekine, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 824 days.

(21) Appl. No.: 12/985,312

(22) Filed: Jan. 5, 2011

(65) Prior Publication Data
US 2012/0169838 A1 Jul. 5, 2012

(51) Int. Cl.
*H04N 7/15* (2006.01)
*H04N 7/14* (2006.01)

(52) U.S. Cl.
CPC . *H04N 7/144* (2013.01); *H04N 7/15* (2013.01)
USPC ...................................... 348/14.16

(58) Field of Classification Search
USPC ............. 348/14.01, 14.16, E07.083, E13.001
See application file for complete search history.

(56) References Cited

U.S. PATENT DOCUMENTS

| 3,291,905 | A | 12/1966 | Smith |
| 4,890,314 | A | 12/1989 | Judd et al. |
| 5,159,445 | A | 10/1992 | Gitlin et al. |
| 5,359,362 | A | 10/1994 | Lewis et al. |
| 5,612,733 | A | 3/1997 | Flohr |
| 5,666,153 | A | 9/1997 | Copeland |
| 5,757,424 | A | 5/1998 | Frederick |
| 5,841,441 | A | 11/1998 | Smith |
| 5,856,842 | A | 1/1999 | Tedesco |
| 6,208,373 | B1 | 3/2001 | Acknen |
| 6,259,470 | B1 | 7/2001 | Koizumi et al. |

(Continued)

FOREIGN PATENT DOCUMENTS

| EP | 1038405 A1 | 9/2000 |
| EP | 1507419 A1 | 2/2005 |

(Continued)

OTHER PUBLICATIONS

S. Skerjanc and J. Liu, "A three camera approach for calculating disparity and synthesizing intermediate pictures", Signal Processing Image Communications 4, dated 1991, (abstract only; full article not available to applicant), 1 page.

*Primary Examiner* — Duc Nguyen
*Assistant Examiner* — Theodore Ndje
(74) *Attorney, Agent, or Firm* — Hickman Palermo Truong Becker Bingham Wong LLP; Edward A. Becker

(57) ABSTRACT

Methods, devices, and non-transitory computer-readable storage media are disclosed for allowing video conferencing participants to maintain eye contact with each other. A display is disposed between a first video capture device and a second video capture device. The video capture devices capture images of a subject video conferencing participant. Images from the first capture device are associated with images from the second video capture device for transmission over a network to a video conferencing agent of a peer video conferencing participant. Images of the peer video conferencing participant are received over the network and displayed on the display that is disposed between the video capture devices. The video capture devices may be disposed at a height that is approximately even with a focal point of the subject video conferencing participant such that the subject video conferencing participant appears, to the peer video conferencing participant, to be making eye contact with the peer video conferencing participant when he is looking at the images of the peer video conferencing participant on the display.

32 Claims, 11 Drawing Sheets

(56) References Cited

U.S. PATENT DOCUMENTS

| | | | |
|---|---|---|---|
| 6,414,709 | B1 | 7/2002 | Palm et al. |
| 6,496,361 | B2 | 12/2002 | Kim et al. |
| 6,674,877 | B1 | 1/2004 | Jojic et al. |
| 6,724,417 | B1 | 4/2004 | Hillis et al. |
| 6,771,303 | B2 | 8/2004 | Zhang et al. |
| 6,798,457 | B2 | 9/2004 | Boyden et al. |
| 6,864,912 | B1 | 3/2005 | Mahaffey et al. |
| 6,943,843 | B2 | 9/2005 | Boyden et al. |
| 7,257,272 | B2 | 8/2007 | Blake et al. |
| 7,292,735 | B2 | 11/2007 | Blake et al. |
| 7,428,330 | B2 | 9/2008 | Blake et al. |
| 7,492,407 | B2 | 2/2009 | Shibata et al. |
| 7,515,173 | B2 | 4/2009 | Zhang et al. |
| 7,528,879 | B2 | 5/2009 | Kuroki |
| 7,570,803 | B2 | 8/2009 | Criminisi et al. |
| 7,587,062 | B2 | 9/2009 | Cornog et al. |
| 7,706,576 | B1 | 4/2010 | Chen |
| 7,773,108 | B2 | 8/2010 | Hillis et al. |
| 7,809,183 | B2 | 10/2010 | Criminisi et al. |
| 7,934,232 | B1 | 4/2011 | Jerding et al. |
| 7,949,616 | B2 | 5/2011 | Angel-Levy |
| 7,957,581 | B2 * | 6/2011 | Wu .................... 382/154 |
| 7,961,643 | B2 | 6/2011 | Avila |
| 7,962,370 | B2 | 6/2011 | Rodriguez et al. |
| 7,992,163 | B1 | 8/2011 | Jerding et al. |
| 7,992,166 | B2 | 8/2011 | Jerding et al. |
| 8,006,262 | B2 | 8/2011 | Rodriguez et al. |
| 8,006,273 | B2 | 8/2011 | Rodriguez |
| 8,020,184 | B2 | 9/2011 | Jerding et al. |
| 8,026,931 | B2 | 9/2011 | Sun et al. |
| 8,032,914 | B2 | 10/2011 | Rodriguez |
| 8,037,504 | B2 | 10/2011 | Jerding et al. |
| 8,056,106 | B2 | 11/2011 | Rodriguez et al. |
| 8,068,161 | B2 | 11/2011 | Shibata et al. |
| 8,069,259 | B2 | 11/2011 | Rodriguez et al. |
| 8,161,388 | B2 | 4/2012 | Banker |
| 8,165,282 | B1 | 4/2012 | Coughlan et al. |
| 8,189,472 | B2 | 5/2012 | McDonald et al. |
| 8,191,093 | B2 | 5/2012 | Rodriguez |
| 8,213,673 | B2 | 7/2012 | Cornog |
| 8,233,204 | B1 | 7/2012 | Robbins et al. |
| 8,284,233 | B2 | 10/2012 | Bennett et al. |
| 8,299,979 | B2 | 10/2012 | Rambo et al. |
| 8,319,819 | B2 | 11/2012 | MacDonald et al. |
| 8,320,606 | B1 | 11/2012 | Moorer |
| 8,330,791 | B2 | 12/2012 | Gorzynski et al. |
| 8,355,041 | B2 | 1/2013 | Chen et al. |
| 8,384,791 | B2 * | 2/2013 | Porter et al. ............ 348/222.1 |
| 8,385,590 | B1 | 2/2013 | Moorer |
| 8,390,667 | B2 | 3/2013 | Mauchly et al. |
| 2010/0201780 | A1 | 8/2010 | Bennett et al. |
| 2010/0225735 | A1 | 9/2010 | Shaffer et al. |
| 2010/0283830 | A1 | 11/2010 | Hillis et al. |
| 2011/0090303 | A1 | 4/2011 | Wu et al. |
| 2011/0249086 | A1 * | 10/2011 | Guo et al. ............. 348/14.12 |
| 2012/0050458 | A1 * | 3/2012 | Mauchly et al. ........ 348/14.16 |
| 2012/0274734 | A1 | 11/2012 | Byers |
| 2012/0274735 | A1 | 11/2012 | Byers |

FOREIGN PATENT DOCUMENTS

| | | |
|---|---|---|
| WO | WO0110121 A1 | 2/2001 |
| WO | WO2008120125 A1 | 10/2008 |
| WO | WO2008137362 A1 | 11/2008 |

* cited by examiner

US 8,823,769 B2

THREE-DIMENSIONAL VIDEO CONFERENCING SYSTEM WITH EYE CONTACT

FIELD OF THE INVENTION

The present invention relates to video conferencing.

BACKGROUND

Video conferencing systems allow video conferencing participants to see and hear each other as they converse. During video conferencing, video of one video conferencing participant is captured by that participant's video capture device, sent from that participant's video conferencing agent to a peer video conferencing agent over a network, and displayed to a peer video conferencing participant.

Video capture devices may be purchased separately or built into a device. For example, laptops and mobile devices often have a built-in video camera above the display for capturing video. Alternatively, a standalone video camera be purchased separately and configured to interact with any general purpose computer. For example a standalone video camera may interact with a computer via a Universal Serial Bus (USB) connection.

Existing video conferencing systems do not allow participants to maintain eye contact with each other. A video conferencing participant must choose whether to look at the video camera or to look at the display. If the video conferencing participant chooses to look at the video camera, then the video conferencing participant appears to be looking at the peer. Unfortunately, the video conferencing participant looking at the video camera is not actually looking at the display of the peer and cannot effectively interact with the peer.

If the video conferencing participant chooses instead to look at the display, then the video conferencing participant does not appear to be looking at the peer. From the perspective of the camera capturing the participant, as displayed to the peer, the video conferencing participant appears to be looking to something next to the camera, i.e. the display.

Eye contact is an important part of face-to-face communication that is missing and overlooked in existing video conferencing systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Methods, devices, and non-transitory computer-readable storage media are disclosed for allowing video conferencing participants to maintain eye contact with each other. A display is disposed between a first video capture device and a second video capture device. The video capture devices capture images of a subject video conferencing participant. Images from the first capture device are associated with images from the second video capture device for transmission over a network to a video conferencing agent of a peer video conferencing participant. Images of the peer video conferencing participant are received over the network and displayed on the display that is disposed between the video capture devices. The video capture devices may be disposed at a height that is approximately even with a focal point of the subject video conferencing participant such that the subject video conferencing participant appears, to the peer video conferencing participant, to be making eye contact with the peer video conferencing participant when he is looking at the images of the peer video conferencing participant on the display.

DETAILED DESCRIPTION

Figure 1:
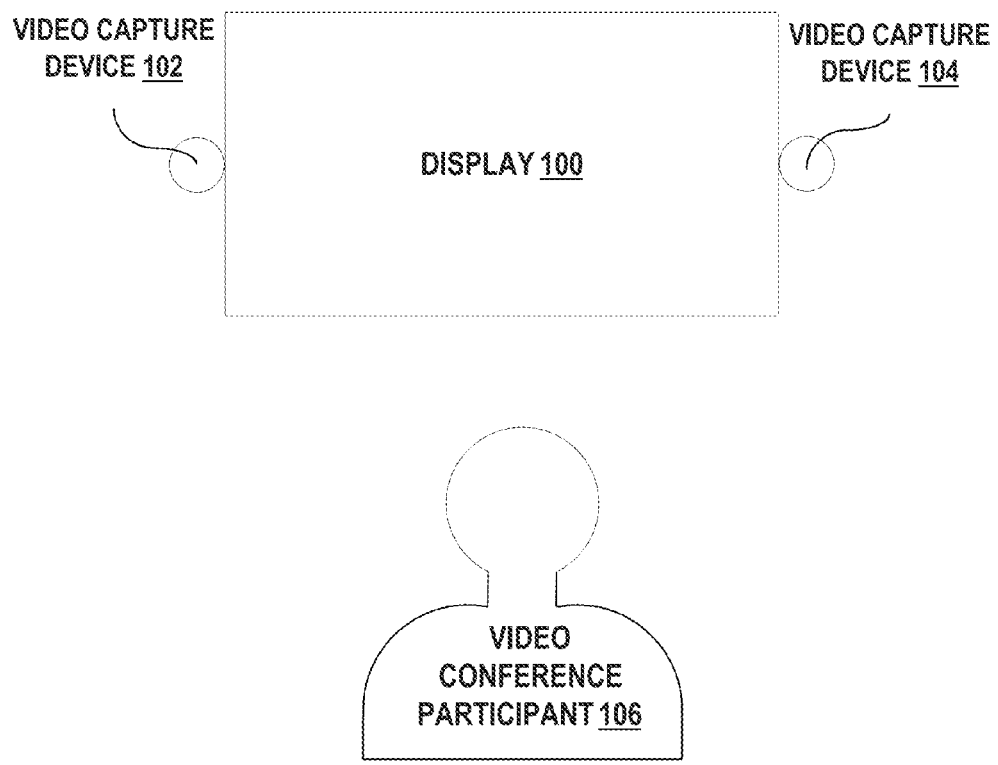
FIG. 1, FIG. 4, and FIG. 5 illustrate example video conferencing systems having a display between two video capture devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods, devices, and non-transitory computer-readable storage media are disclosed for allowing video conferencing participants to maintain eye contact with each other. A display is disposed between a first video capture device and a second video capture device. The video capture devices capture images of a subject video conferencing participant. Images from the first capture device are associated with images from the second video capture device for transmission over a network to a video conferencing agent of a peer video conferencing participant. Images of the peer video conferencing participant are received over the network and displayed on the display that is disposed between the video capture devices. The video capture devices may be disposed at a height that is approximately even with a focal point of the subject video conferencing participant such that the subject video conferencing participant appears, to the peer video conferencing participant, to be making eye contact with the peer video conferencing participant when he is looking at the images of the peer video conferencing participant on the display.

In one embodiment, the captured images include a first view of the subject video conferencing participant captured from a first side of the display and a second view of the subject video conferencing participant captured from a second side of the display. In one embodiment, the first side of the display is opposite or approximately opposite the first side of the display.

In one embodiment, the video capture devices are configured based on a detected eye position of the subject video conferencing participant relative to at least one of the video capture devices. For example, the video capture devices may be moved vertically with respect to the display to align with the eye position of the subject video conferencing participant.

In another embodiment, the video capture devices and/or the display are rotated based on a physical position of the subject video conferencing participant relative to at least one of the video capture devices. For example, the video conferencing system may configure the video capture devices and/or the display to account for a subject video conferencing participant who is not centered with respect to the video capture devices and/or the display.

In one embodiment, images of the subject video conferencing participant are processed for three-dimensional viewing by cropping images of the subject video conferencing participant based at least in part on a physical characteristic of the peer video conferencing participant. For example, the physical characteristic may include a distance between eyes of the peer video conferencing participant, a distance of the peer video conferencing participant from cameras, or a size of the face of the peer video conferencing participant. Three-dimensional viewing may be optimized for the peer video conferencing participant when images of the subject video conferencing participant are cropped based on a physical characteristic of the viewing video conferencing participant.

Three-Dimensional Displays

The techniques described herein are not limited to any particular type of three-dimensional display. Video conferencing agents for different video conferencing participants may be configured to use different three-dimensional displays to provide a three-dimensional video conferencing experience. In one embodiment, a video conferencing participant uses overlapping displays polarized in roughly orthogonal directions to each other. The video conferencing participant wears glasses or contacts with lenses that are polarized in the roughly orthogonal directions to each other. As a result, the video conferencing participant sees one set of images with one eye and another set of images with the other eye. The polarization in the display and glasses may be linear or circular.

In another embodiment, a video conferencing participant uses overlapping displays of different sets of colors. The video conferencing participant wears glasses with lenses that filter out colors from different sets. In one embodiment, the different sets of colors are complementary colors such as red and cyan. In another embodiment, one set of colors includes a first type of red, a first type of green, and a first type of blue, and the other set of colors includes a second type of red, a second type of green, and a second type of blue. As a result, the video conferencing participant sees one set of images with one eye and another set of images with the other eye.

Another popular type of three-dimensional display relies on frequency rather than filters to display stereoscopic images. In one embodiment, a video conferencing participant uses a display that alternately displays images to be viewed by alternate eyes. The video conferencing participant wears shutter glasses synchronized with the display. The shutter glasses alternately each eye of the video conferencing participant such that the video conferencing participant sees one set of images with one eye and another set of images with the other eye.

In yet another embodiment, an autostereoscopic display is used to display images to a video conferencing participant without the use of glasses or contacts. The autostereoscopic display displays different sets of images when viewed at different viewing angles. In one example, the autostereoscopic display includes a parallax barrier disposed in front of a display of the images. The parallax barrier includes precision slits directed to different pixels of the display. If the viewing angles of the eyes of the video conferencing participant are roughly aligned with the precision slits, then the display appears to be three-dimensional without requiring the video conferencing participant to wear specialized glasses or contacts.

Setup of the Video Conferencing System

In one embodiment, a display is disposed between a first video capture device and a second video capture device. A video conferencing agent is configured to cause images of a peer video conferencing participant to be displayed on the display.

The video capture devices may be disposed at a height that is approximately even with a focal point of the subject video conferencing participant such that the subject video conferencing participant appears, to the peer video conferencing participant, to be making eye contact with the peer video conferencing participant when he is looking at the images of the peer video conferencing participant on the display. If the video conferencing devices are below the focal point of the subject video conferencing participant, then the subject video conferencing participant would appear to be looking upwardly even if he is looking at the images of the peer video conferencing participant. Similarly, if the video conferencing devices are above the focal point of the subject video conferencing participant, then the subject video conferencing participant would appear to be looking downwardly even if he is looking at the images of the peer video conferencing participant. Enabling the video conferencing participants to mutually focus on each other, and to appear in their images to be mutually focusing on each other, provides a more natural video conferencing experience that better emulates real person-to-person contact.

Because the video capture devices are in different physical positions, the video capture devices capture different views of the video conferencing participant. A left device captures a left view, and a right device captures a right view. The left view and the right view may be combined together to form three-dimensional images of the video conferencing participant as if the different views corresponded to the different eyes of a peer video conferencing participant.

In FIG. 1, display 100 is disposed between video capture device 102 and video capture device 104. As shown, the video capture devices 102 and 104 are roughly centered vertically with respect to display 100. In other embodiments, video capture devices 102 and 104 may be off-centered vertically with respect to display 100. Video conference participant 106 views display 100 as video capture devices 102 and 104 capture, from different angles, video of video conference participant 106.

Figure 2:
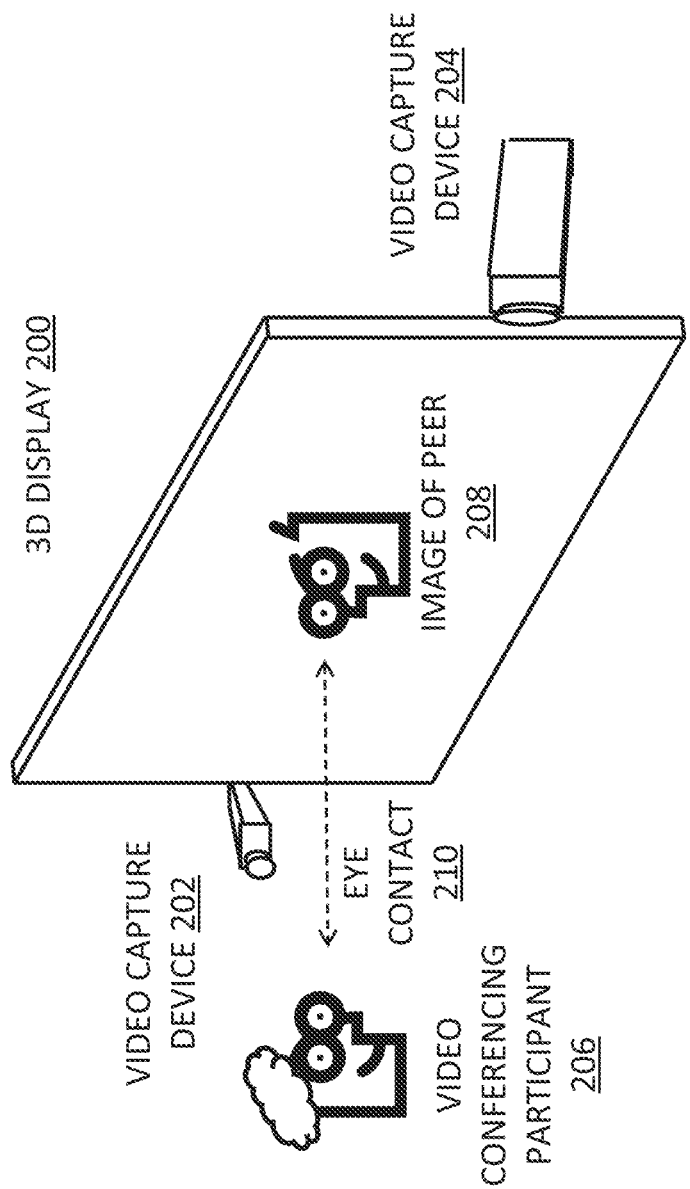
FIG. 2 illustrates an example video conferencing system that allows video conferencing participants to maintain eye contact with each other.

FIG. 2 illustrates a video conferencing system that allows a video conferencing participant 206 to maintain eye contact with a peer video conferencing participant. As shown, display 200 is disposed between video capture device 202 and video capture device 204. As shown, video capture devices 202 and 204 are approximately aligned vertically with the eyes of the peer video conferencing participant as displayed in image of peer video conferencing participant 208. In one embodiment as shown, the eyes of the peer video conferencing participant in image of peer video conferencing participant 208 are approximately centered horizontally with respect to the display.

Accordingly, when a focal point of video conferencing participant 206 is approximately the eyes or face of the peer video conferencing participant in image of peer video conferencing participant 208, video conferencing participant 206 appears, to the peer video conferencing participant, to be looking at the eyes or face of the peer video conferencing participant. The focal point of video conferencing participant 206 represents a point on which video conferencing participant 206 is focusing at any given time. The focal point of either video conferencing participant may change during the course of a video conferencing session. In an example video conferencing session, the focal point of one video conferencing participant is on the eyes of the other video conferencing participant during a majority of the session.

In one embodiment, the length of the display is part of a horizontal axis, and the display spans the horizontal axis between the horizontal positions of the video capture devices. In one embodiment, the horizontal axis is along a position of the eyes of the peer video conferencing participant as displayed on the display. In a particular example, the video capture devices are approximately aligned with the display along the horizontal axis. In various other embodiments, the video capture devices vary from the display with respect to a vertical position and/or a depth position. In one embodiment, the subject participant is centered or approximately centered along the horizontal axis with respect to the video capture devices and/or the display.

In one embodiment, the height of the display is part of a vertical axis, and the video capture devices have the same or approximately the same vertical position as each other. The vertical position of the video capture devices may or may not be overlapping with the vertical span of the display. For example, the video capture devices may be higher, lower, or approximately the same height as a center of the display. As referred to herein, the display is "between" the cameras regardless of the height of the cameras, so long as the display spans the horizontal axis between the horizontal positions of the video capture devices.

In one embodiment, the depth of the display is part of a depth axis, and the video capture devices have the same or roughly the same depth position as each other. The depth position of the video capture devices may or may not be overlapping with the depth span of the display. For example, the video capture devices may be closer to, roughly the same distance as, or further from the participant than the display along the depth axis. As referred to herein, the display is "between" the cameras regardless of the depth of the cameras, so long as the display spans the horizontal axis between the horizontal positions of the video capture devices.

The display may be described as lying in a central region that is not limited by height or depth. A region to the left of the display is referred to as the left side of the display, and a region to the right of the display is referred to as a right side of the display. A left camera is disposed on the left side of the display, and a right camera is disposed on the right side of the display. In other words, the cameras are disposed on opposite sides of the display. The cameras may or may not be coupled to the display.

Figure 3:
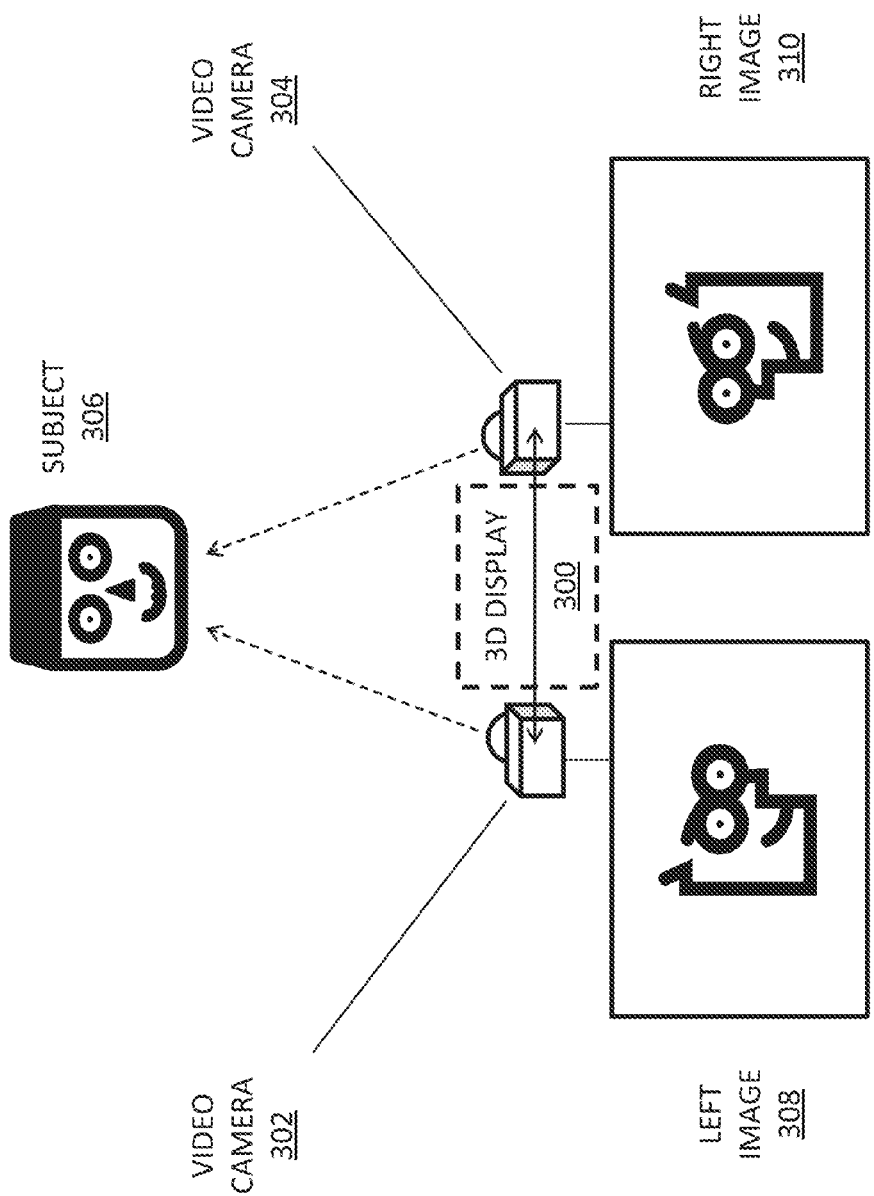
FIG. 3 illustrates example images that are captured from a first video camera and a second video camera in an example video conferencing system.

In the example of FIG. 3, display 300 is represented by dotted lines to illustrate that display 300 may have any depth from subject 306. As shown, display 300 is disposed between video camera 302 and video camera 304. Video camera 302 captures a set of images of subject 306 from a left viewing angle, including a left image 308 that is captured at an approximate time. Video camera 304 captures a set of images of subject 306 from a right viewing angle, including a right image 310 that is captured at an approximate time. Images 308 and 310 may be associated to each other and combined to form a three-dimensional image based at least in part on the approximate time in which they were captured. In one embodiment, images 308 and 310 are received by an image processor (not shown) at approximately the same time in a streaming capture mode. The image processor processes images 308 and 310 for three-dimensional viewing.

In one embodiment, the cameras are mounted to the display. For example, a left camera may be mounted on a left border of the display, and a right camera may be mounted on a right border of the display. In one embodiment, the cameras are adjustably mounted to opposite sides of the display such that the cameras can rotate and/or slide vertically with respect to the display. In a particular embodiment, the cameras and display are mounted on a slide or swivel that is adjustable. Adjustment of the cameras and/or the display may be motorized and optionally controlled by the video conferencing system.

In various embodiments, the video conferencing system also includes one or more microphones. The one or more microphones may be disposed anywhere in the environment. In one embodiment, a first microphone is disposed on the left side of the display, and a second microphone is disposed on the right side of the display. Recordings from two or more microphones may be combined into a stereo sound recording.

Figure 4:
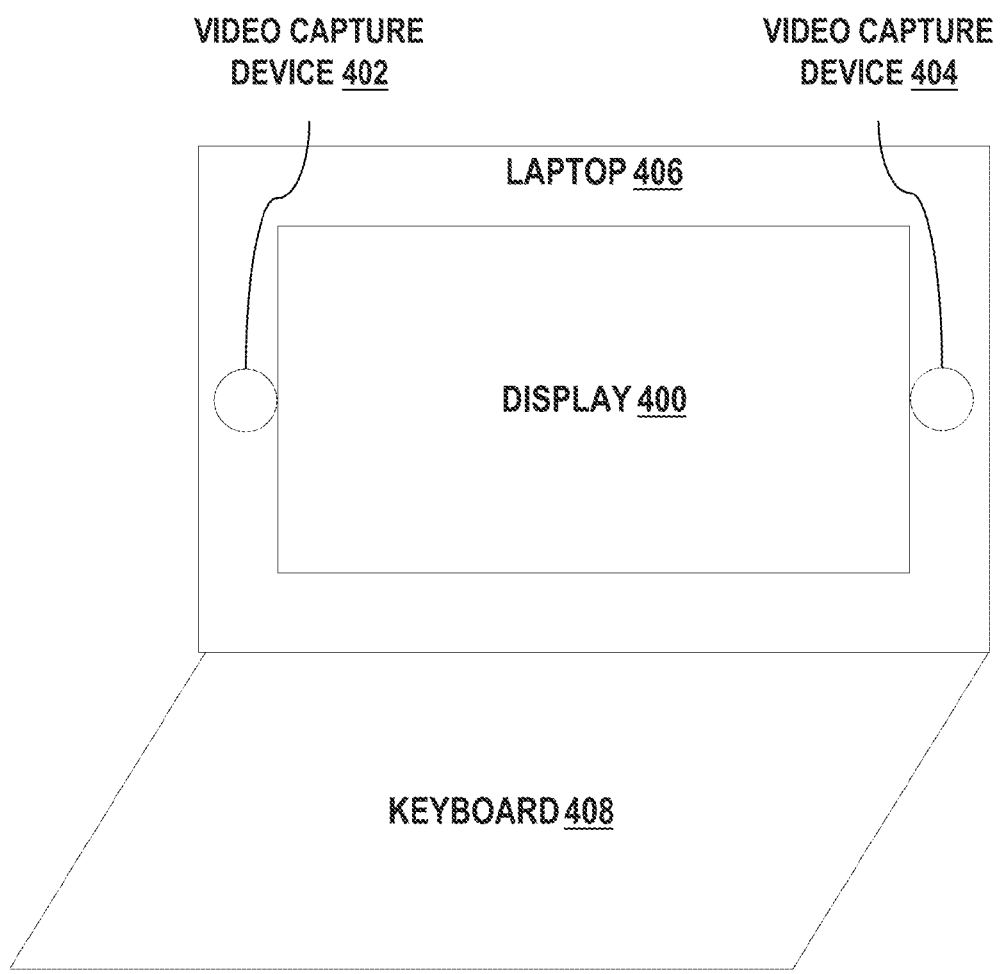
Figure 5:
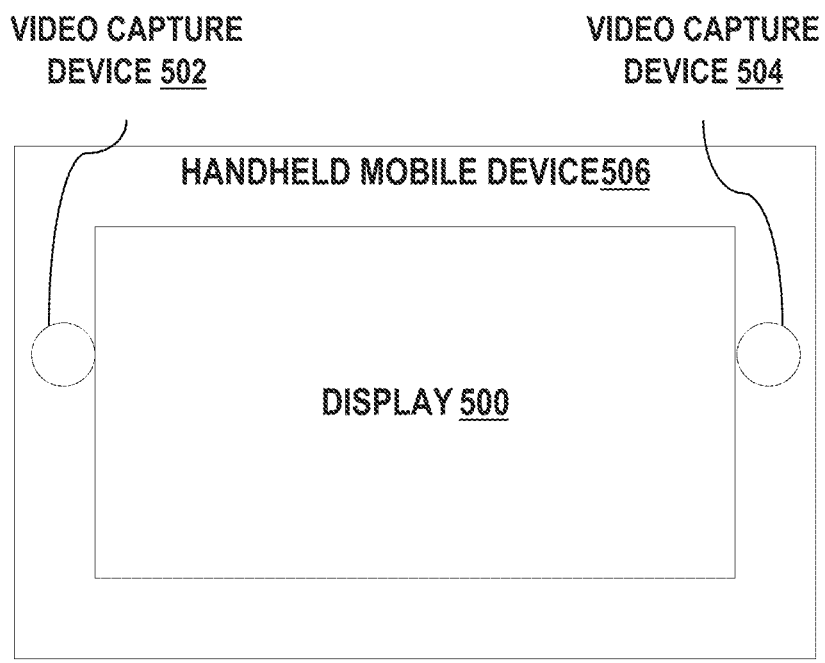

The video capture devices and/or the display may be sold separately or as a set. Mounting equipment may also be sold separately or together with one or both of the video capture devices and/or the display. In one embodiment, the video capture devices and the display are built-in to a laptop or a handheld mobile device, which may be sold as a single unit. FIG. 4 illustrates an example video conferencing system built into laptop 406, and FIG. 5 illustrates an example video conferencing system built into a handheld mobile device 506. A non-transitory computer-readable storage medium may be sold with or separately from the video capture devices, the mounting equipment, and/or the display. The non-transitory computer-readable storage medium stores instructions that cause one or more computing devices to implement processes of the video conferencing system as described herein.

Various techniques described herein provide a more natural video conferencing experience that better emulates real person-to-person contact. The availability of a more realistic video conference experience may increase the popularity of video conferencing in general, thereby increasing the use and sales of video cameras, displays, and/or video conferencing software. Thus, device manufacturers and software developers may both experience an increased revenue stream due at least in part to the availability of a more realistic video conferencing experience.

Further, service providers offering a more natural video conferencing experience may gain more long-term subscriptions service bundles than service providers that cannot offer the more natural video conferencing experience, thereby increasing the long-term revenue of the service provider. Similarly, service providers may form partnerships with device manufacturers or software developers to offer devices that allow customers to maintain eye contact while video conferencing. As a result, customers may switch from one service provider to another service provider for the capability of maintaining eye contact with other potential video conferencing participants. Therefore, the techniques described herein can have cascading effects on the success, revenue, and reputation of various types of businesses.

Configuring the Video Capture Devices and/or the Display

In various embodiments, the video conferencing system may configure a position and direction of the video capture devices and/or the display based on physical information about the subject video conferencing participant. Configuration of the video capture devices and/or the display may be performed by the video conferencing system prior to, during, or after a video conferencing session with the peer video conferencing system.

In one embodiment, the video conferencing system detects a physical position of the subject video conferencing participant relative to at least one of the video capture devices and/or the display. In one example, the video conferencing system detects a horizontal position of the subject video conferencing participant. In response to detecting that the subject video conferencing participant is off-centered with respect to the video capture devices and/or the display, the video conferencing system may automatically rotate the video capture devices and/or the display. In one embodiment, the physical rotation may be performed by one or more motorized swivels on the video capture devices and/or the display. In a particular example, the video conferencing system controls the motorized swivel to rotate the video capture devices and/or the display. Alternatively, the video conferencing system displays instructions that direct the subject video conferencing participant to manually rotate the video capture devices and/or the display.

In another embodiment, the video conferencing system detects an eye position or face position of the subject video conferencing participant and/or the image of the peer video conferencing participant relative to at least one of the video capture devices and/or the display. In one example, the video conferencing system detects a vertical position of the eyes of the subject video conferencing participant. In response to detecting the vertical position is not aligned with the vertical position of the video capture devices and/or the display, the video conferencing system may automatically adjust the vertical position of the video capture devices and/or the display. In one embodiment, adjustment of the vertical position may be performed by one or more motorized slides or gears that shift the video capture devices and/or the display vertically up or down. Alternatively, the video conferencing system displays instructions that direct the subject video conferencing participant to manually adjust the video capture devices and/or the display.

In another embodiment, the video capture devices may be aligned or approximately aligned with the face and/or eyes of the peer video conferencing participant in an image of peer video conferencing participant displayed on the display. For example, the image may be shifted such that the image of the eyes is approximately the same vertical height as the video capture devices. In another example, the vertical position of the video capture devices is adjusted.

Figure 6:
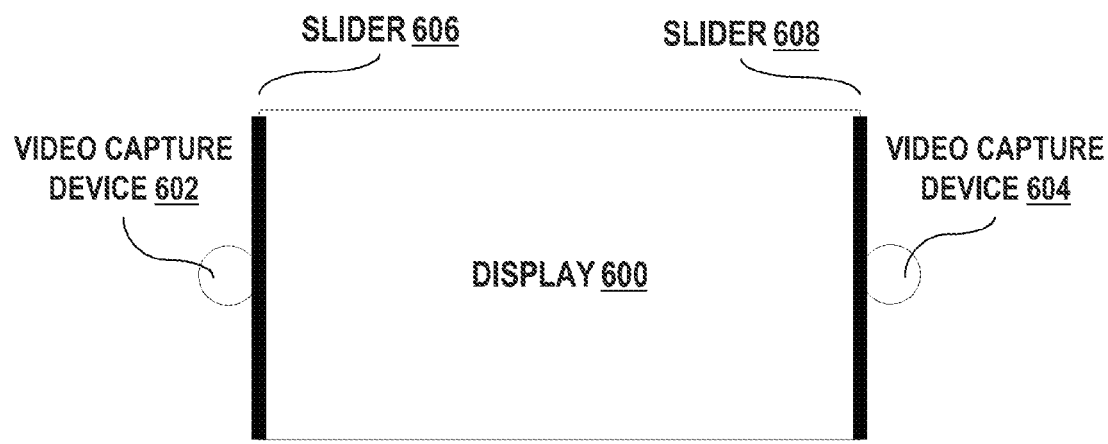
FIG. 6 illustrates an example video conferencing system with vertically adjustable cameras on each side.

FIG. 6 illustrates an example video conferencing system with sliders 606 and 608 to adjust, manually or automatically, video capture devices 602 and 604. As shown, sliders 606 and 608 are mounted to opposite sides of display 600, and video capture devices 602 and 604 are mounted to sliders 606 and 608, respectively. Video capture devices 602 and 604 may be adjusted based on an eye position or a face position of a video conferencing participant.

In yet another embodiment, the subject video conferencing system communicates with a peer video conferencing system to receive information from the peer video conferencing participant. The received information may also cause the subject video conferencing system to rotate and/or vertically adjust the video capture devices and/or the display. For example, the peer video conferencing participant may instruct the subject video conferencing system to rotate the cameras and swivel the display when the peer video conferencing participant notices that the subject video conferencing participant is off-center.

Video Conferencing Systems

A subject video conferencing participant (i.e., a human being or other living animal) uses the video conferencing system to interact with one or more peers over a network. The subject video conferencing system may be configured with a two-dimensional or three-dimensional display and a three-dimensional capture system. In one embodiment, a peer video conferencing participant has a same or similar video conferencing system as the subject video conferencing participant. In other embodiments, the peer video conferencing system varies according to the various embodiments described herein.

In one example, the peer video conferencing system may be configured with a three-dimensional capture system and/or a three-dimensional display. In another example, the peer video conferencing participant has a two-dimensional capture system and/or a two-dimensional display. For example, a peer two-dimensional capture system captures images from a camera for sending to the subject video conferencing system. The subject video conferencing system receives the two-dimensional images and displays the two-dimensional images on the subject display.

In yet another example, a peer two-dimensional display receives images from the subject video conferencing system and displays the received images in two dimensions on the peer display. In one embodiment, three-dimensional images captured from the subject video capture system are processed by the subject video conferencing system and/or by the peer video conferencing system to convert the three-dimensional images into a virtual two-dimensional image for display on a two-dimensional display. For example, a face of the subject video conferencing participant may be modeled three-dimensionally into a virtual face object having a three-dimensional shape such as an ovoid with insets for the eyes and a protrusion for the nose. The three-dimensional images may be mapped onto the face object for two-dimensional display to the peer.

Alternatively, the subject video conferencing system and/or the peer video conferencing system selects a single view including one of two sets of images from a set of stereoscopic images of the subject video conferencing participant. The selected set of images may be displayed two-dimensionally to the peer video conferencing participant.

Figure 7:
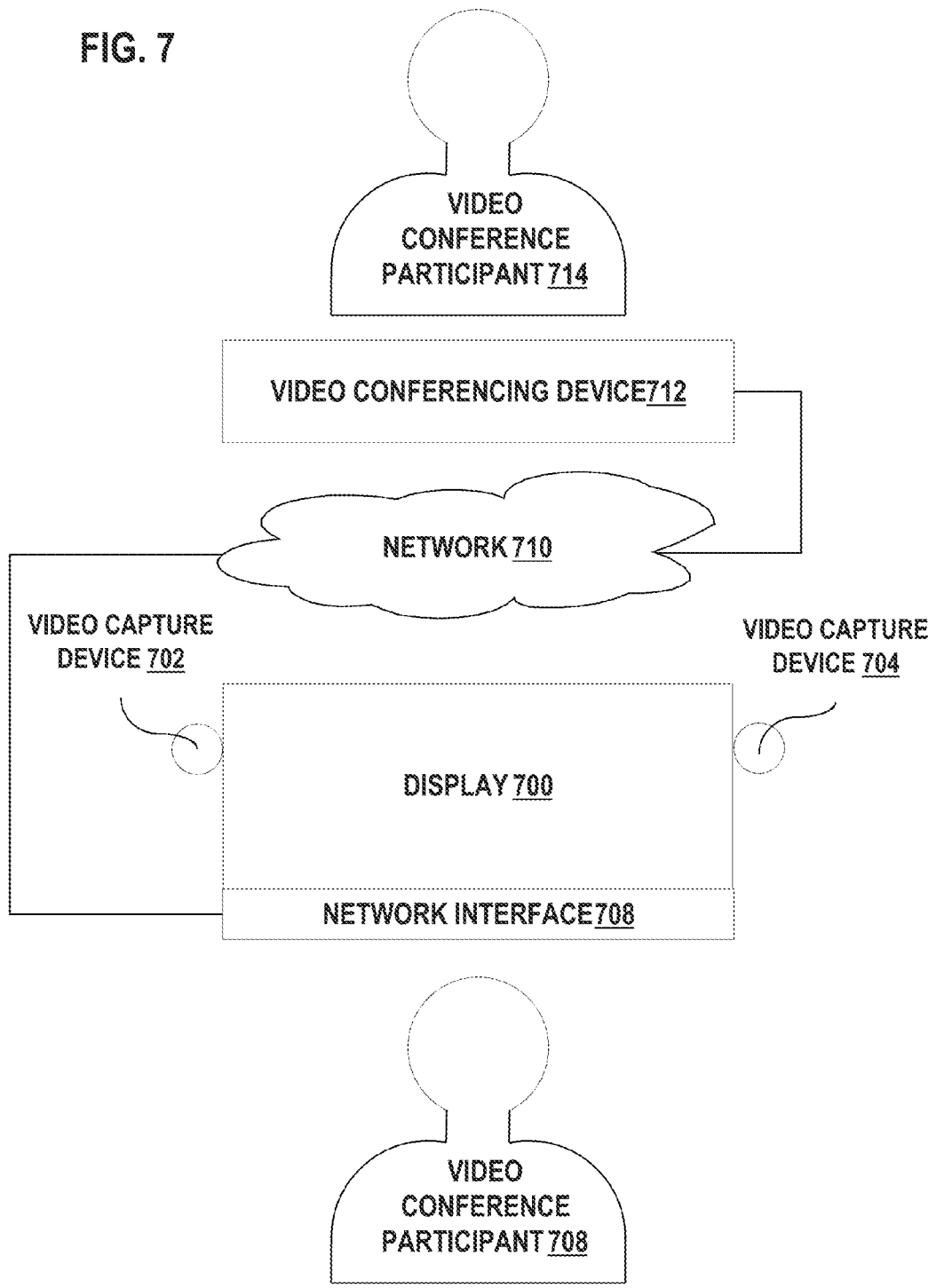
FIG. 7 illustrates an example video conferencing system that allows video conferencing participants to hold a video conferencing session over a network.

FIG. 7 illustrates an example of a subject video conferencing system in communication with a peer video conferencing system. As shown, display 700 is disposed between video capture device 702 and video capture device 704. Display is configured to display images of video conference participant 714 received from video conferencing device 712 over network 710. Video capture devices 702 and 704 capture images of video conference participant 708, and the images, which may or may not be processed by a computer system (not shown) after capture, are provided to network interface 708 for transmission to video conferencing device 712 over network 710. At video conferencing device 712, video conference participant 714 views images of video conference participant 708.

Video Conferencing Process

A subject video conferencing participant uses the video conferencing system to interact with one or more peer video conferencing participants in a video conferencing session. A participant may initiate a video conferencing session when the participant calls, messages, or otherwise initiates contact with another participant. In one embodiment, the participants initiate contact with each other by joining the same virtual room. The video conferencing systems of each participant capture, process, and exchange images over a network. For example, images of a peer video conferencing participant received from a peer video conferencing system are displayed to a subject video conferencing participant.

At a subject video conferencing system, different views of a subject video conferencing participant are captured by video capture devices. Images from the different views are processed and prepared for transmission over a network to a peer video conferencing system. The peer video conferencing system may communicate information about acceptable formats in which the peer video conferencing system receives images to be displayed to the peer video conferencing participant. In one embodiment, preparing the images for transmission includes processing the images to conform a format accepted by the peer video conferencing system. Processing the images may also include cropping, enlarging, shifting to center, downsizing, adjusting the brightness, contrast, and/or white balance, compressing, and/or encrypting the images.

Figure 8:
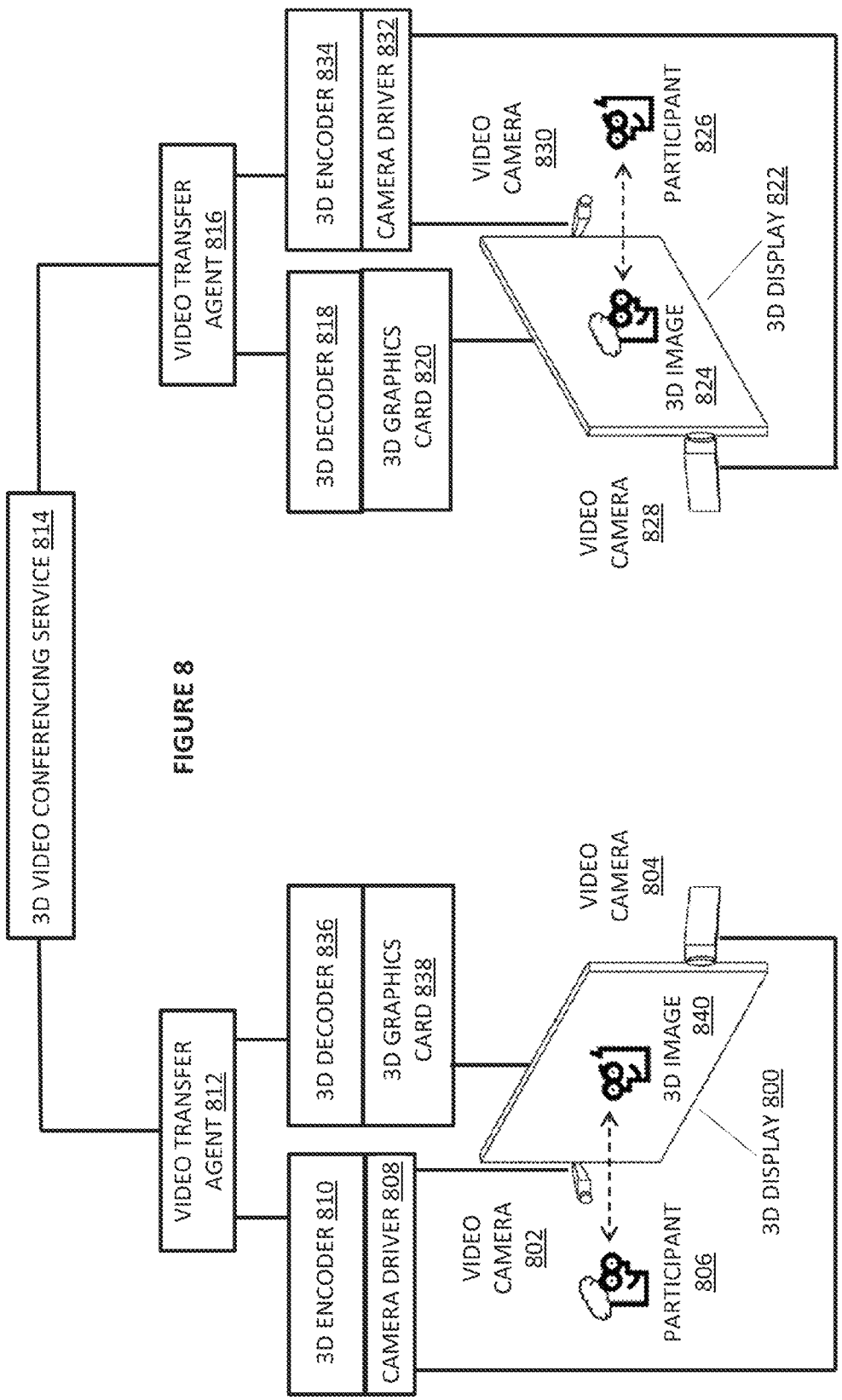
FIG. 8 illustrates an example video conferencing system that allows video conferencing participants to maintain eye contact in a video conferencing session over a network.

FIG. 8 illustrates example participants in communication with each other over a video conferencing session. Video cameras 802 and 804 capture images of participant 806 from opposite sides of 3D display 800. Camera driver 808 includes one or more camera drivers that interface with video cameras 802 and 804 and perform initial processing to save or stream the captured images onto a volatile or non-volatile computer-readable storage medium. For example, the captured images may be streamed into a video capture buffer. 3D encoder 810 processes the captured images for transmission from video transfer agent 812 on a first video conferencing system to video transfer agent 816 on a second video conferencing system. The processed images of participant 806 are transmitted according to an agreed-upon protocol for video conferencing service 814 between video transfer agent 812 and video transfer agent 816.

In a particular embodiment, the subject video conferencing system communicates with a peer video conferencing system to receive information about one or more physical characteristics of a peer video conferencing participant. Based on the physical characteristics of the peer video conferencing participant, the subject video conferencing system processes images for three-dimensional viewing by the peer video conferencing participant by cropping images from a first set of images from a first camera and images from a second set of images from a second camera. For example, the physical characteristic may include a distance between eyes of the peer video conferencing participant, a distance of the peer video conferencing participant from cameras, or a size of the face of the peer video conferencing participant.

In a particular example, a distance between the eyes of the peer video conferencing participant is used to determine how much of the image to crop. The distance between the eyes of the peer video conferencing participant may be compared to the distance between the video capture devices in the subject video conferencing system. If the distance is equal, then, in one embodiment, the subject video conferencing system determines that no cropping is required. If the video capture devices in the subject video conferencing system are at a much greater distance apart than the eyes of the peer video conferencing participant, then the image is cropped to improve the realism of three-dimensional viewing for the peer video conferencing participant. For medium to large displays in the subject video conferencing system, the distance between the video capture devices is expected to be larger than the distance between the eyes of the peer video conferencing participant. Thus, in one embodiment, images are cropped more when the peer video conferencing participant has eyes that are closer together and less when the peer video conferencing participant has eyes that are further apart.

Figure 9:
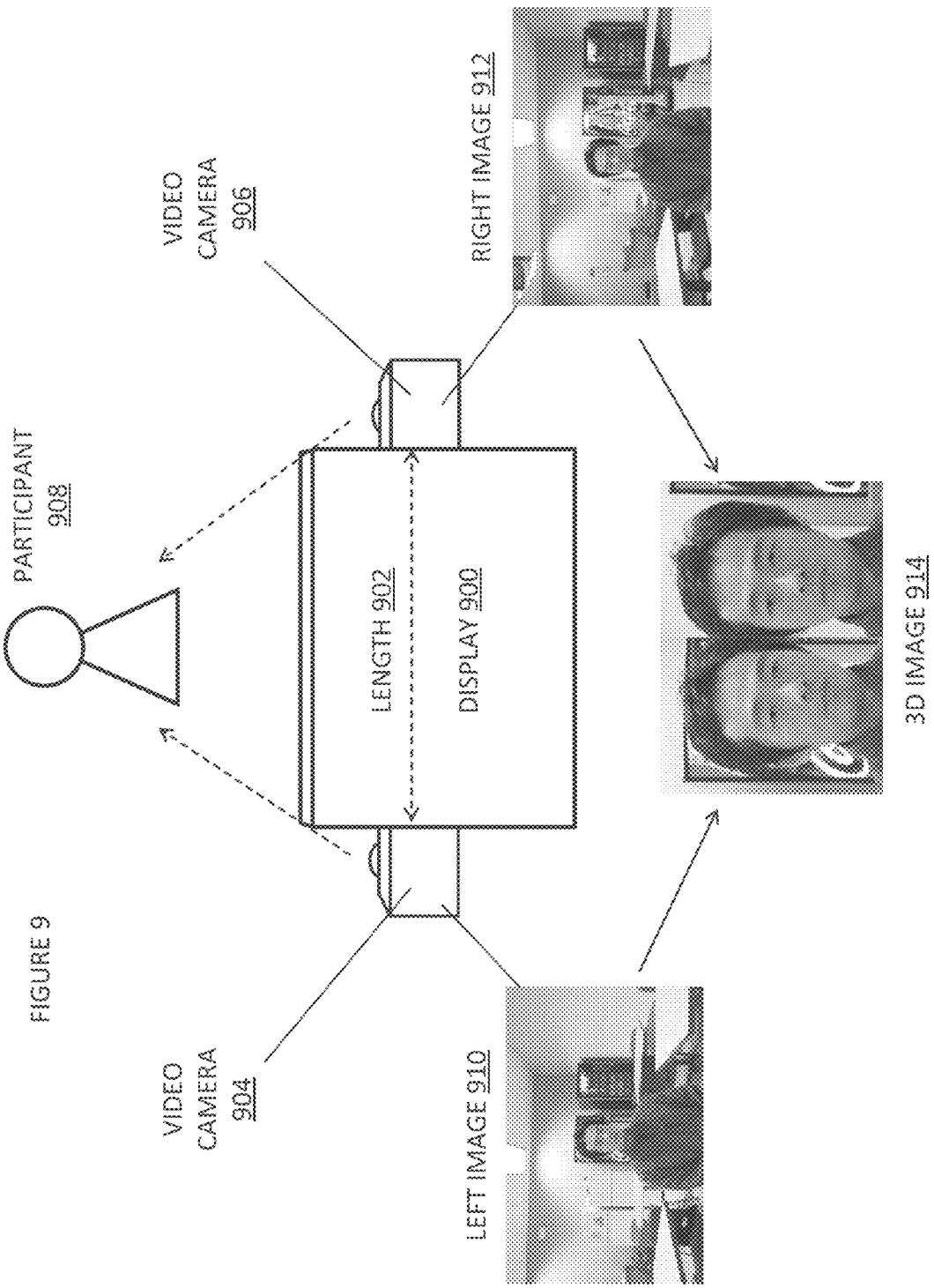
FIG. 9 and FIG. 10 illustrate example video conferencing systems in which captured images are processed to generate a three-dimensional image.

FIG. 9 illustrates a process of cropping images 910 and 912 of participant 908 for viewing by a peer video conferencing participant (not shown). FIG. 9 illustrates a display 900 with length 902 that is greater than a distance between the eyes of a peer video conferencing participant. At least partially as a result, images 910 and 912 include more background between the face of participant 908 than a peer video conferencing participant would naturally see when physically viewing participant 908. Accordingly, images 910 and 912 are cropped and shifted to center to make 3D viewing of participant 908 more natural for a peer video conferencing participant. In one embodiment, the amount of cropping and shifting is based on a distance between the eyes of the peer video conferencing participant. In another embodiment, the amount of cropping and shifting is based on an estimated or averaged distance between eyes of peer video conferencing participants.

The amount of cropping that is performed may be based on a sizing factor that accounts for the viewing angle from the eyes of the peer and the size of the display. In a particular example, the amount of image that is cropped is based on a ratio of the distance between the eyes of the peer to the horizontal length of the display. If the display is 20" and the distance between the eyes of the peer is 5", then, in one example, the image cropped to 5/20 or 1/4 of its original size. If the image was originally 1920 pixels by 1080 pixels (i.e., 1080p HD), then the image is cropped to focus or zoom in on a 960 pixel by 540 pixel portion, representing a scaled one fourth of the original image. In various other embodiments, the amount of cropping to be performed may be determined by modifying the ratio by a constant value or by using another function that accounts for the distance between the eyes of the peer and/or the horizontal length of the display.

In one embodiment, the images are shifted to center such that the face and/or the eyes of the subject video conferencing participant is approximately in the center of the images. In a particular example, the images are shifted such that the eyes of the subject video conferencing participant are positioned in a specified vertical position and/or a specified horizontal position. For example, the vertical position may be specified by the peer video conferencing system, or by an agreed-upon protocol between the video conferencing systems. The images may be cropped and shifted such that the eyes of the subject video conferencing participant are positioned at approximately 70% of the height of the image.

Figure 10:
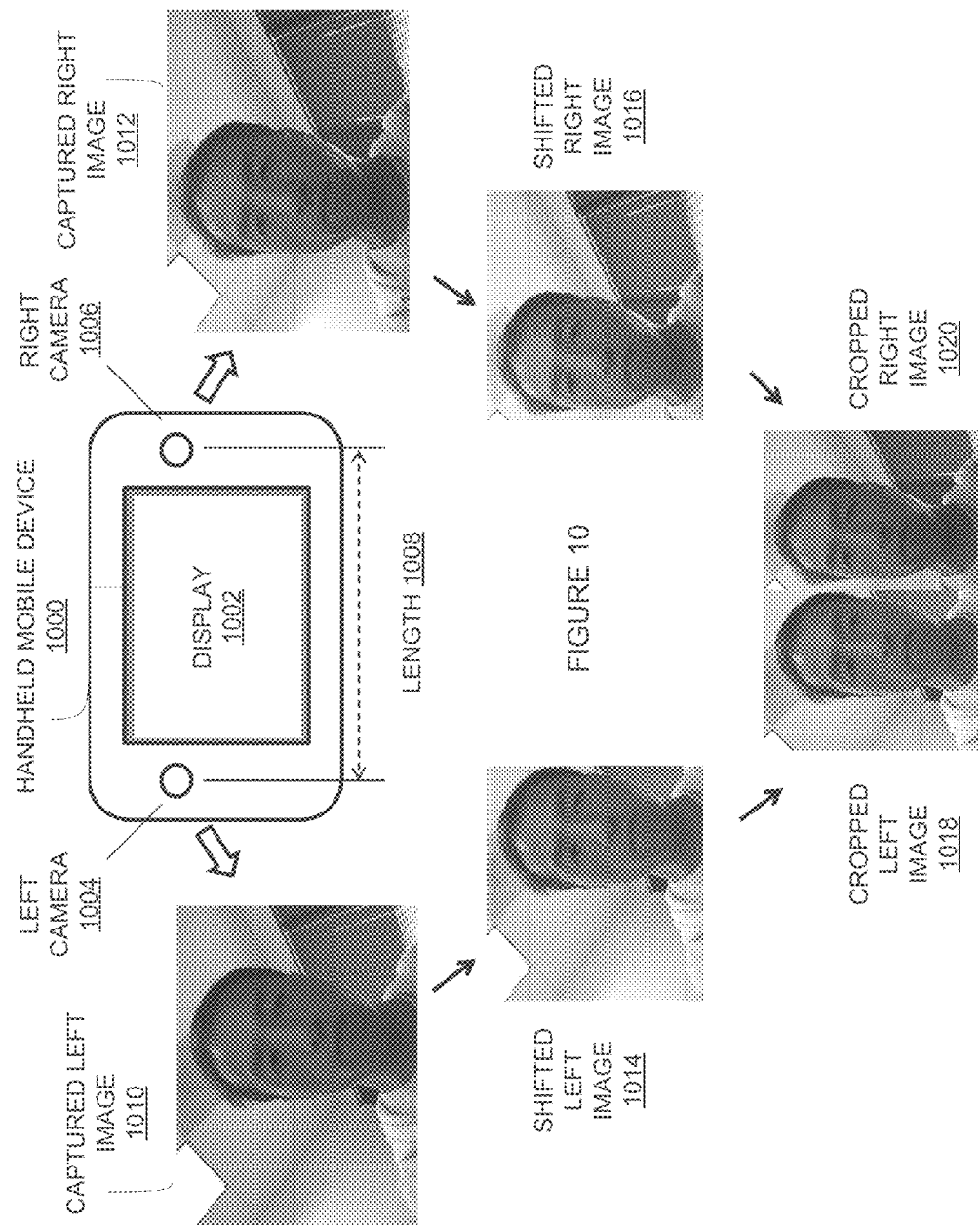

FIG. 10 illustrates an example handheld mobile device 1000 for processing images before sending the images to a peer video conferencing system. Handheld mobile device 1000 includes a display 1002 disposed between a left camera 1004 and a right camera 1006. Left camera captures left image 1010 of a video conference participant, and right camera captures right image 1012 of the video conference participant. Images 1010 and 1012 are shifted to center to generate shifted images 1014 and 1016, and cropped to generate cropped images 1018 and 1020. In one embodiment, the amount of shifting and cropping that is performed is based at least in part on a difference between a length 1008 between cameras 1004 and 1006 and a distance between eyes of a peer video conferencing participant (not shown). In one embodiment, a distance between eyes of the peer video conferencing participant is estimated based on received 3D images from a peer video conferencing system. In one embodiment, handheld mobile device communicates with the peer video conferencing system over a network managed by a wireless provider to receive the 3D images and optionally information about physical characteristics of the peer video conferencing participant.

The peer video conferencing system receives images of the subject video conferencing participant over a network, processes the images, and displays the images to a peer video conferencing participant. Processing the received images may include changing the format of the images, cropping, enlarging, shifting to center, downsizing, adjusting the brightness, contrast, and/or white balance, decompressing, and/or decrypting the images.

Referring again to FIG. 8, at the second video conferencing system, the images of participant 806 are received at 3D decoder. 3D decoder decodes the received images, and prepares the images for 3D graphics card 820. 3D graphics card 820 displays 3D image 824 of participant 806 on 3D display 822 for viewing by participant 826.

The peer video conferencing system also sends images of the peer video conferencing participant to the subject video conferencing system. The subject video conferencing system receives images of the peer video conferencing participant, processes the images, and displays the images to the subject video conferencing participant. In one embodiment, the subject video conferencing system processes the received images such that the face and/or the eyes of the peer video conferencing participant are displayed in a specified position on the display. In a particular example, the eyes of the peer video conferencing participant in the displayed images are at a vertical position that is approximately even with the vertical positions of the cameras. Displaying the eyes of the peer video conferencing participant at approximately the same vertical positions of the cameras creates an effect where, as the subject video conferencing participant focuses on the eyes of the peer video conferencing participant, the subject video conferencing participant also appears to looking directly into the camera.

As shown in FIG. 8, both video conferencing systems concurrently capture, transmit, receive, and display video. Video cameras 828 and 830 capture video of participant 826. Camera driver interfaces with video cameras 828 and 830 to provide images to encoder 834, which processes the images for transmission and for 3D viewing. Video transfer agent transmits the processed images of participant 826 to video transfer agent 812. The received images of participant 826 are decoded by 3D decoder 836 and provided to 3D graphics card 838 for display on 3D display 800. 3D display 800 displays 3D image 840 of participant 826 to participant 806. The dotted lines in FIG. 8 represent eye contact between the participants, which is maintained by both participants 806 and 826 during at least part of the video conferencing session.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
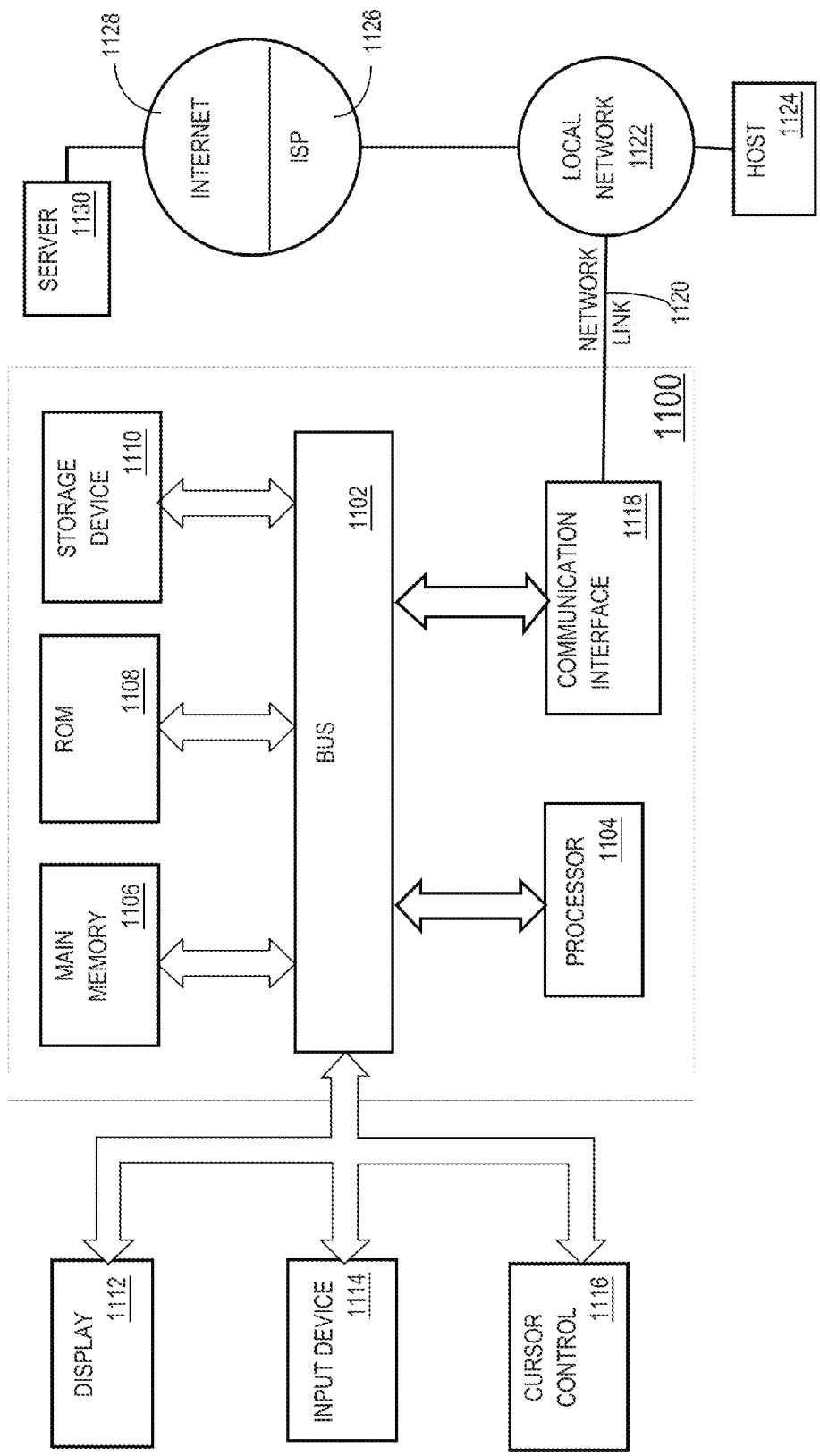
FIG. 11 illustrates an example computer system for performing various processes described herein.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable storage media storing instructions for video conferencing, wherein the instructions, when executed by one or more processors, cause:
    receiving a first set of two-dimensional images of a first video conferencing participant from a first video capture device and a second set of two-dimensional images of the first video conferencing participant from a second video capture device;
    associating images from the first set of two-dimensional images with images from the second set of two-dimensional images to create a first set of three-dimensional images of the first video conferencing participant, wherein each three-dimensional image of the first set of three-dimensional images comprises:
        a two-dimensional image of the first set of two-dimensional images, and
        a two-dimensional image of the second set of two-dimensional images;
    transmitting, over a network to a video conferencing instance for a second video conferencing participant, the first set of three-dimensional images;
    receiving, over the network, a second set of three-dimensional images of the second video conferencing participant, wherein each three-dimensional image of the second set of three-dimensional images comprises:
        a two-dimensional image of a third set of two-dimensional images of the second video conferencing participant, and
        a two-dimensional image of a fourth set of two-dimensional images of the second video conferencing participant; and
    based on the second set of three-dimensional images, causing display, on a display disposed between the first video capture device and the second video capture device, of images of the second video conferencing participant.

2. One or more non-transitory computer-readable storage media as recited in claim 1, wherein the first set of two-dimensional images comprises a first view of the first video conferencing participant captured from a first side of the display, wherein the second set of two-dimensional images comprises a second view of the first video conferencing participant captured from a second side of the display, and wherein the first side of the display is approximately opposite the second side of the display.

3. One or more non-transitory computer-readable storage media as recited in claim 1, wherein the instructions, when executed by the one or more processors, cause detecting an eye position of the first video conferencing participant relative to at least one of the first video capture device and the second video capture device; and, based at least in part on the eye position of the first video conferencing participant, moving the first video capture device and the second video capture device vertically with respect to the display.

4. One or more non-transitory computer-readable storage media as recited in claim 1, wherein the instructions, when executed by the one or more processors, cause processing the first set of three-dimensional images of the first video conferencing participant by cropping images from the first set of two-dimensional images and images from the second set of two-dimensional images based at least in part on a physical characteristic of the second video conferencing participant.

5. One or more non-transitory computer-readable storage media as recited in claim 4, wherein the physical characteristic of the second video conferencing participant includes a distance between eyes of the second video conferencing participant.

6. One or more non-transitory computer-readable storage media as recited in claim 1, wherein the instructions, when executed by the one or computing devices, cause detecting a physical position of the first video conferencing participant relative to at least one of the first video capture device and the second video capture device; and, based at least in part on the physical position, rotating the first video capture device and the second video capture device.

7. A video conferencing system comprising:
a first video capture device;
a second video capture device;
a display disposed between the first video capture device and the second video capture device;
non-transitory image processing logic configured to cause:
receiving a first set of two-dimensional images of a first video conferencing participant from the first video capture device and a second set of two-dimensional images of the first video conferencing participant from the second video capture device;
associating images from the first set of two-dimensional images with images from the second set of two-dimensional images to create a first set of three-dimensional images of the first video conferencing participant, wherein each three-dimensional image of the first set of three-dimensional images comprises:
a two-dimensional image of the first set of two-dimensional images, and
a two-dimensional image of the second set of two-dimensional images;
transmitting, over a network to a video conferencing instance for a second video conferencing participant, the first set of three-dimensional images;
receiving, over the network, a second set of three-dimensional images of the second video conferencing participant, wherein each three-dimensional image of the second set of three-dimensional images comprises:
a two-dimensional image of a third set of two-dimensional images of the second video conferencing participant, and
a two-dimensional image of a fourth set of two-dimensional images of the second video conferencing participant; and
based on the second set of three-dimensional image, causing display of the images of the second video conferencing participant on the display.

8. A video conferencing system as recited in claim 7, wherein the first set of two-dimensional images comprises a first view of the first video conferencing participant captured from a first side of the display, wherein the second set of two-dimensional images comprises a second view of the first video conferencing participant captured from a second side of the display, and wherein the first side of the display is approximately opposite the second side of the display.

9. A video conferencing system as recited in claim 7, further comprising non-transitory configuration logic for detecting an eye position of the first video conferencing participant relative to at least one of the first video capture device and the second video capture device; and, based at least in part on the eye position of the first video conferencing participant, moving the first video capture device and the second video capture device vertically with respect to the display.

10. A video conferencing system as recited in claim 7, wherein the non-transitory image processing logic is further configured to cause processing the first set of three-dimensional images of the first video conferencing participant by cropping images from the first set of two-dimensional images and images from the second set of two-dimensional images based at least in part on a physical characteristic of the second video conferencing participant.

11. A video conferencing system as recited in claim 10, wherein the physical characteristic of the second video conferencing participant includes a distance between eyes of the second video conferencing participant.

12. A video conferencing system as recited in claim 7, further comprising configuration logic for detecting a physical position of the first video conferencing participant relative to at least one of the first video capture device and the second video capture device; and, based at least in part on the physical position, rotating the first video capture device and the second video capture device.

13. A video conferencing system as recited in claim 7, wherein the display is configured to display stereoscopic images to the first video conferencing participant, and wherein the first video capture device, the second video capture device, and the display are built into a handheld video conferencing device.

14. A video conferencing system comprising:
a first video capture device;
a second video capture device;
one or more fasteners for fastening the first video capture device and the second video capture device to a display;
one or more non-transitory computer-readable storage media storing instructions that, when executed by one or more processors, cause:
receiving a first set of two-dimensional images of a first video conferencing participant from the first video capture device and a second set of two-dimensional images of the first video conferencing participant from the second video capture device;
associating images from the first set of two-dimensional images with images from the second set of two-dimensional images to create a first set of three-dimensional images of the first video conferencing participant, wherein each three-dimensional image of the first set of three-dimensional images comprises:
a two-dimensional image of the first set of two-dimensional images, and
a two-dimensional image of the second set of two-dimensional images;
transmitting, over a network to a video conferencing instance for a second video conferencing participant, the first set of three-dimensional images;
receiving, over the network, a second set of three-dimensional images of the second video conferencing participant, wherein each three-dimensional image of the second set of three-dimensional images comprises:
a two-dimensional image of a third set of two-dimensional images of the second video conferencing participant, and a two-dimensional image of a fourth set of two-dimensional images of the second video conferencing participant; and based on the second set of three-dimensional images, causing display, on a display disposed between the first video capture device and the second video capture device, of images of the second video conferencing participant.

15. A video conferencing system as recited in claim 14, wherein the first set of two-dimensional images comprises a first view of the first video conferencing participant captured from a first side of the display, wherein the second set of two-dimensional images comprises a second view of the first video conferencing participant captured from a second side of the display, and wherein the first side of the display is approximately opposite the second side of the display.

16. A video conferencing system as recited in claim 14, wherein the instructions, when executed by the one or more processors, further cause detecting an eye position of the first video conferencing participant relative to at least one of the first video capture device and the second video capture device; and, based at least in part on the eye position of the first video conferencing participant, moving the first video capture device and the second video capture device vertically with respect to the display.

17. A video conferencing system as recited in claim 14, wherein the instructions, when executed by the one or more processors, further cause processing the first set of three-dimensional images of the first video conferencing participant by cropping images from the first set of two-dimensional images and images from the second set of two-dimensional images based at least in part on a physical characteristic of the second video conferencing participant.

18. A video conferencing system as recited in claim 17, wherein the physical characteristic of the second video conferencing participant includes a distance between eyes of the second video conferencing participant.

19. A video conferencing system as recited in claim 14, wherein the instructions, when executed by the one or more processors, further cause detecting a physical position of the first video conferencing participant relative to at least one of the first video capture device and the second video capture device; and, based at least in part on the physical position, rotating the first video capture device and the second video capture device.

20. A video conferencing system as recited in claim 14, wherein the one or more fasteners comprise one or more slides for sliding the first video capture device and the second video capture device vertically with respect to the display, and wherein the one or more slides are lockable into a specified position.

21. One or more non-transitory computer-readable storage media as recited in claim 1, wherein the display is a two-dimensional display, wherein the instructions, when executed, further cause creating virtual three-dimensional images based on the second set of three-dimensional images that were received, and wherein causing display of images of the second video conferencing participant comprises causing display of the virtual three-dimensional images on the two-dimensional display.

22. One or more non-transitory computer-readable storage media as recited in claim 1, wherein the display is a three-dimensional display, and wherein causing display of images of the second video conferencing participant comprises causing stereoscopic display of the three-dimensional images on the three-dimensional display.

23. One or more non-transitory computer-readable storage media as recited in claim 1, wherein the instructions, when executed, cause processing the second set of three-dimensional images of the second video conferencing participant by cropping images from the third set of two-dimensional images and images from the fourth set of two-dimensional images based at least in part on a physical characteristic of the first video conferencing participant.

24. One or more non-transitory computer-readable storage media as recited in claim 23, wherein the physical characteristic of the first video conferencing participant includes a distance between eyes of the first video conferencing participant.

25. A video conferencing system as recited in claim 7, wherein the display is a two-dimensional display, wherein the non-transitory image processing logic is further configured to cause creating virtual three-dimensional images based on the second set of three-dimensional images that were received, and wherein causing display of images of the second video conferencing participant comprises causing display of the virtual three-dimensional images on the two-dimensional display.

26. A video conferencing system as recited in claim 7, wherein the display is a three-dimensional display, and wherein causing display of images of the second video conferencing participant comprises causing stereoscopic display of the three-dimensional images on the three-dimensional display.

27. A video conferencing system as recited in claim 7, wherein the non-transitory image processing logic is configured to cause processing the second set of three-dimensional images of the second video conferencing participant by cropping images from the third set of two-dimensional images and images from the fourth set of two-dimensional images based at least in part on a physical characteristic of the first video conferencing participant.

28. A video conferencing system as recited in claim 27, wherein the physical characteristic of the first video conferencing participant includes a distance between eyes of the first video conferencing participant.

29. A video conferencing system as recited in claim 14, wherein the display is a two-dimensional display, wherein the instructions, when executed, further cause creating virtual three-dimensional images based on the second set of three-dimensional images that were received, and wherein causing display of images of the second video conferencing participant comprises causing display of the virtual three-dimensional images on the two-dimensional display.

30. A video conferencing system as recited in claim 14, wherein the display is a three-dimensional display, and wherein causing display of images of the second video conferencing participant comprises causing stereoscopic display of the three-dimensional images on the three-dimensional display.

31. A video conferencing system as recited in claim 14, wherein the instructions, when executed, cause processing the second set of three-dimensional images of the second video conferencing participant by cropping images from the third set of two-dimensional images and images from the fourth set of two-dimensional images based at least in part on a physical characteristic of the first video conferencing participant.

32. A video conferencing system as recited in claim 31, wherein the physical characteristic of the first video conferencing participant includes a distance between eyes of the first video conferencing participant.

* * * * *

UNITED STATES PATENT AND TRADEMARK OFFICE
CERTIFICATE OF CORRECTION

| | |
|---|---|
| PATENT NO. | : 8,823,769 B2 |
| APPLICATION NO. | : 12/985312 |
| DATED | : September 2, 2014 |
| INVENTOR(S) | : Hitoshi Sekine |

It is certified that error appears in the above-identified patent and that said Letters Patent is hereby corrected as shown below:

IN THE CLAIMS:

Column 15:

1. Claim 7, line 57, delete "image" and insert --images--

Signed and Sealed this
Tenth Day of February, 2015

Michelle K. Lee
*Deputy Director of the United States Patent and Trademark Office*